March 11, 1969  H. W. BORER ET AL  3,432,051

LOADER FRAME FOR TRACK-TYPE LOADERS

Filed March 29, 1967

INVENTORS
HERBERT W. BORER
CHARLES C. EHLKE
JAMES SVOBODA

BY

ATTORNEYS

United States Patent Office 3,432,051
Patented Mar. 11, 1969

3,432,051
LOADER FRAME FOR TRACK-TYPE LOADERS
Herbert W. Borer and Charles C. Ehlke, Naperville, and James Svoboda, North Aurora, Ill., assignors to Caterpillar Tractor Co., Peoria, Ill., a corporation of California
Filed Mar. 29, 1967, Ser. No. 626,830
U.S. Cl. 214—140
Int. Cl. E02f 3/36, 3/00
1 Claim

ABSTRACT OF THE DISCLOSURE

A frame for supporting the lift and tilt mechanisms and the bucket of a loader mounted on a track-type tractor and for supporting the engine thereof which also has a rearward extension for supporting the operator's station of the loader.

---

Figure 1:
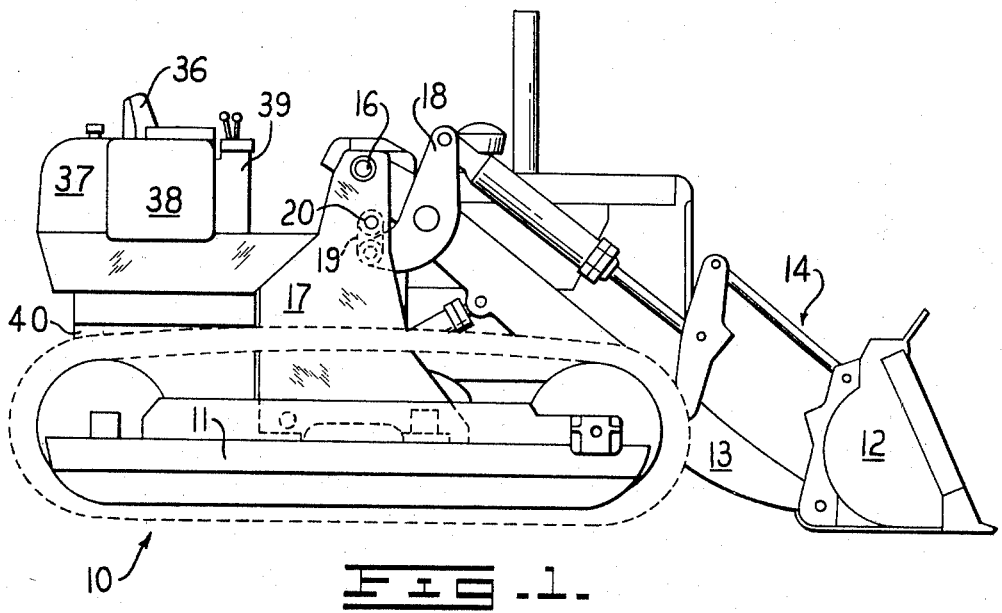

Previously known loaders on track-type tractors are supported on a rugged frame carried by the track roller frames of the tractor and the frame has a forwardly extending portion, the function of which is to support the tractor engine. The operator's station of these tractors which includes the seat, fuel tank, hydraulic reservoir tank and other components presently rest on members secured to the bevel gear case which houses a portion of the final drive of the tractor. Sheet metal panels secure the various components to the bevel gear case and to the frame. The weight of the components resting on the gear case as well as stresses which are induced while operating the machine cause deflections in the gear case loosening the bolts which secure the panels in place and sometimes shearing them. It is the object of the present invention to overcome the difficulties resulting from supporting the operator's station on the bevel gear case of the tractor and specifically to provide means in the form of a support rigidly secured to and carried by the main loader frame which supports the operator's station entirely separately and independently of the bevel gear case.

Further and more specific objects of the invention and the manner in which it is carried into practice are made apparent in the following specification wherein reference is made to the accompanying drawing.

Figure 2:
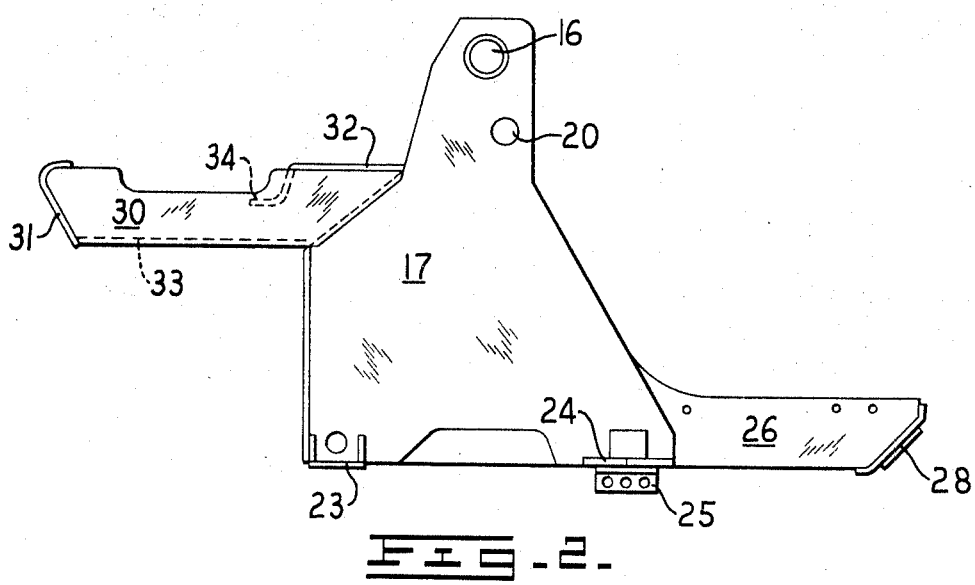

In the drawing:

FIG. 1 is a view in side elevation of a loader mounted on a track-type tractor; and FIG. 2 is a view in side elevation of the frame which mounts the loader and tractor engine and which, according to the present invention, also supports the operator's station.

The tractor shown in FIG. 1 is shown as comprising a pair of track assemblies, one of which is generally indicated at 10, having track roller frames such as shown at 11. A forwardly disposed loader bucket 12 is carried on lift arms 13 and manipulated by tilt linkage, generally indicated at 14, in a well known manner. The lift arms are pivotally supported as at 16 on loader supporting members 17 of a loader support frame as shown in FIG. 2. The tilt linkage is also connected with the loader support members wherein a lever 18 of the linkage is connected by a link shown at 19 with the pivot point 20. This pair of loader support members are connected to the track roller frames by bolts which extend through pads such as shown at 23, 24 and 25 in FIG. 2. Extending forwardly of the loader support members and secured thereto as by welding is a pair of engine support members, one being shown at 26 and which are connected forwardly as by plates 28 which serve to strengthen these members and also as a guard to protect the lower portion of the engine.

According to the present invention, there are also secured as by welding to the loader support members 17 a pair of rearwardly extending plates 30 connected as by a cross member 31 at their rear ends and also provided with corner plates 32 and inwardly extending flanges 33 and 34 shown in dotted lines which may be suitably perforated for the reception of bolts employed in securing an operator's station in place in a position above the bevel gear housing without transmitting unusual stresses thereto. As shown in FIG. 1, the operator's station includes a seat 36, a fuel tank 37, a hydraulic tank 38 and a control console 39. The bevel gear housing is illustrated at 40 and the rearwardly extending arms 30 which form an integral part of the main loader supporting frame carry the weight of all of these elements and transmit stresses imposed directly to the track frames rather than to the housing of the bevel gears.

We claim:

1. In a tractor-mounted loader including a loader frame supported on the track roller frames of the tractor and supporting forwardly extending loader components, the improvement which comprises frame members secured to and extending rearwardly of the loader frame and supporting the tractor operator's station free of stress transmitting contact with tractor elements disposed beneath the operator's station, said loader frame comprising two loader supporting members secured one to each track roller frame and extending upwardly therefrom and each having a said fame member for supporting the operator's station extending rearwardly therefrom, and transverse bracing means between said rearwardly extending members.

References Cited

UNITED STATES PATENTS

| | | | |
|---|---|---|---|
| 2,732,963 | 1/1956 | Grubich | 214—762 |
| 2,883,077 | 4/1956 | Pilch | 214—763 |
| 3,007,590 | 11/1961 | Mathew et al. | 214—773 |
| 3,246,778 | 4/1966 | Kampert et al. | 214—776 |
| 3,268,101 | 8/1966 | Pensa | 214—768 |

HUGO O. SCHULZ, Primary Examiner.